Patented Aug. 12, 1947

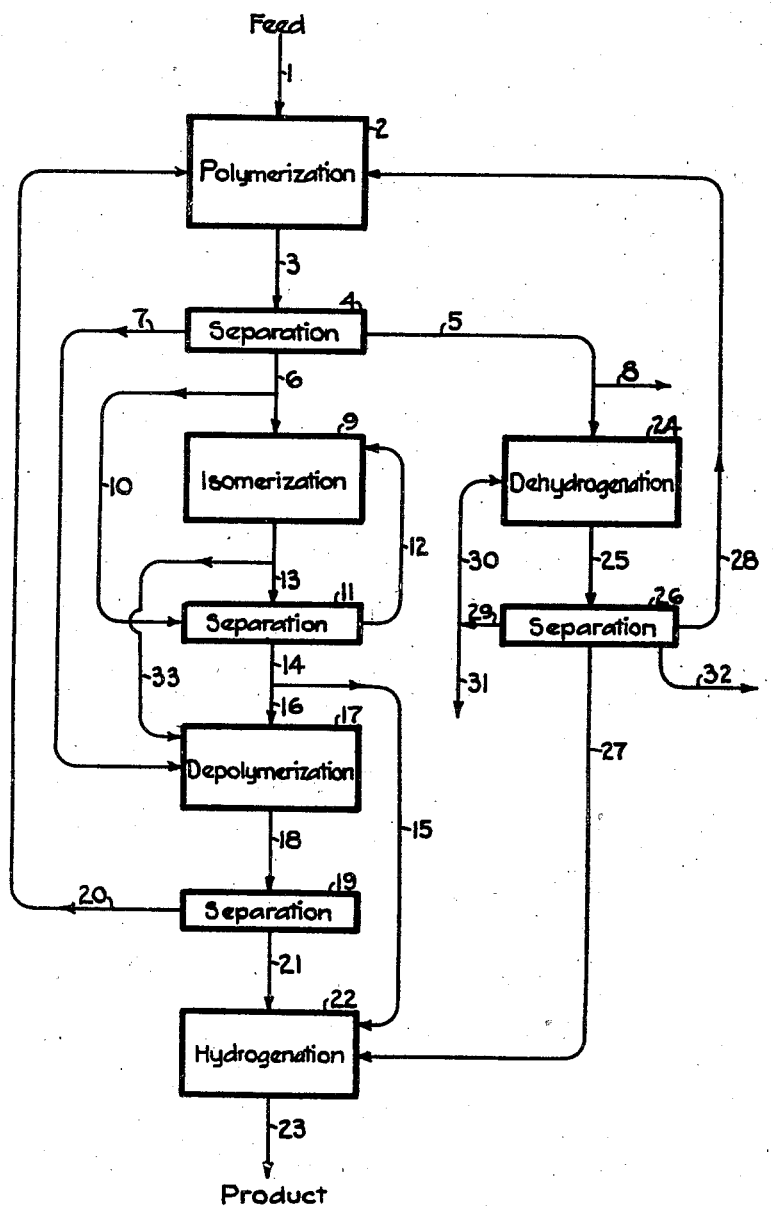

2,425,340

UNITED STATES PATENT OFFICE 2,425,340

PRODUCTION OF HYDROCARBONS

Alan C. Nixon and Orris L. Davis, Oakland, Calif., assignors to Shell Development Company, San Francisco, Calif., a corporation of Delaware Application October 12, 1943, Serial No. 506,012

15 Claims. (Cl. 260—683.6)

This invention relates to the synthesis of hydrocarbons from olefins and pertains to methods of hydrocarbon synthesis involving polymerization, isomerization and hydrogenation. The invention deals particularly with a new method of operation whereby products having superior characteristics which make them more advantageous as components of fuels for supercharged engines are obtained.

It has long been known that polymerization of olefins and hydrogenation of the resulting polymer produce hydrocarbons of high anti-knock value which are very desirable fuel components. In this way the standard reference fuel, iso-octane, has been produced from isobutylene on a large scale. Since the advent of alkylation processes which make it possible to produce in one reaction step hydrocarbons having octane numbers closely approaching that of iso-octane, the more expensive polymerization and hydrogenation procedure has been more or less abandoned. It has now been found, however, that olefin polymerization may be made the source of products having such superior power output in supercharged engines that the increased cost of operation is fully justified.

According to the invention these more valuable hydrocarbons are produced by a new unitary process comprising three and usually more advantageously four steps. In the first step of the process an olefin or olefins are polymerized by any of the suitable methods to produce polymers boiling in the gasoline range, preferably dimers of the starting olefin or olefins. Instead of simply hydrogenating the polymer in accordance with prior practice, the polymer is subjected to an isomerization treatment to effect rearrangement of the carbon atoms and form an olefin having an increased number of substituted carbon atoms in its chain. The rearrangement product is then hydrogenated, most preferably after separating any remaining unisomerized polymer and other undesired components, and a product of improved super-charged rating is obtained.

The isomers present in the product from the isomerization step of the process often have boiling points which are so close together that complete separation is difficult to accomplish by fractional distillation. It is a feature of the invention in one of its preferred forms, that separation of unreacted polymers from the desired rearrangement product is effected by treatment of the mixture to depolymerize the polymer to the monomeric olefin or olefins, from which it was derived. The depolymerization products being of much lower boiling point than the desired rearrangement product can be readily separated and returned to the polymerization step of the process. This new and improved method of separating branched chain hydrocarbons may be advantageously applied to mixtures comprising polymers and their more stable isomers, regardless of the source of the mixture used or of the subsequent treatment or use of the thus-purified product. Also, the isomerization and depolymerization steps of the procedure constitute a useful subcombination process of the invention and may be employed with any polymeric starting material to produce an isomer substantially freed of the initial polymer.

For the purpose of illustrating the combination of steps characteristic of the new unitary process of the invention, reference will be had to the accompanying drawing which shows, diagrammatically, a typical process flow. To simplify the description and make clear the principles on which the invention is based, it will be described with particular reference to its application to the production of aviation gasoline components when using isobutylene as the olefinic starting material. It will be understood, however, that this application of the new process is intended to be illustrative only and that by suitable modification of operating conditions not only may a wide variety of other starting materials be used and other desirable products manufactured but also the flow may be modified and certain of the steps may be omitted, for example, by carrying out the isomerization and depolymerization operations, simultaneously or successively in the same unit instead of in two different reactors as indicated in the drawing.

Referring to the drawing, isobutylene-containing hydrocarbon, for example a butane-butylene fraction of petroleum cracking products, is introduced by line 1 to polymerization unit 2. This polymerization unit may be of any suitable design and may, for example, consist of a single reactor in which the isobutylene in liquid or vapor form is contacted with a solid or liquid polymerization catalyst or may include the several reactors required for polymerization of the isobutylene after absorption in an acid medium or may comprise other types of apparatus. In any case, it is preferred to use polymerization methods which give substantial yields of di-isobutylene. Procedures involving absorption of the isobutylene and heating of the absorption product as described, for example, in United States Patents 2,007,159, 2,133,732 and 2,237,292 are particularly advantageous, especially when the polymerization is carried out in the presence of a solvent for di-isobutylene as claimed in United States Patent 2,228,669. However, procedures employing direct contact of the isobutylene with an acid under polymerization conditions as disclosed in United States Patents 2,007,160 or 2,156,718 may also be used, as well as methods involving the use of other catalysts such, for example, as disclosed in United States Patents 2,055,415, 2,285,920 and 2,293,353. Still other polymerization methods, whether catalytic or not, may be adopted but, in any case, the product will contain di-isobutylene, that is, a mixture of octenes comprising 2,2,4-trimethyl pentenes. Some higher boiling polymer, mainly tri-isobutylene, will also be be obtained in most cases.

The polymerization product after treatment to remove catalyst or other impurities, as by caustic and/or water washing, if necessary, is conducted by line 3 to a separation unit 4 which may consist of one or more fractionating columns and auxiliary equipment. In separation unit 4, any unreacted hydrocarbons may be taken off by line 5 while the desired octenes are removed by line 6 and higher boiling polymers are withdrawn by line 7. The unreacted hydrocarbons which may include unreacted olefins as well as iso- and normal paraffins, taken off by line 5, may be removed from the system by line 8 or further used in the process as by recycling a part to the polymerization, by means not shown, or by other treatment such as dehydrogenation, etc., as more fully described hereinafter. The dimer products of polymerization removed from unit 4 by line 6 may be conveyed directly to isomerization unit 9. In some cases, however, as where the isobutylene is polymerized under conditions at which other olefins such, for example, as normal butylenes present therewith are also reacted as described, for example, in United States Patents 2,174,247, 2,181,640 and 2,232,674, there may be some octenes present which require no isomerization, and in such cases it is preferred to feed the polymers from line 6 by line 10 to a separation unit 11 in which at least a rough separation of the more desirable components is effected prior to isomerization. The octenes having the 2,2,4-trimethyl pentene structure separated in unit 11 may then be fed by line 12 to isomerization unit 9.

The isomerization treatment effected in unit 9 may be carried out in different ways. For example, by contacting the 2,2,4-trimethyl pentenes with suitable catalysts a pinacole type rearrangement of the trimethyl pentene having its quaternary carbon atom connected to an unsaturated carbon atom may be effected and a 2,3,4-trimethyl pentene obtained. Other isomerization products such, for example, as 2,2,3- and 2,3,3-trimethyl pentenes, are also formed in the reaction. One catalyst which may be used to promote this reaction is phosphoric acid which may advantageously be employed in solid form deposited on a carrier such as clay, alumina, activated carbon, or the like. With this catalyst there is a tendency for side reactions, particularly depolymerization and polymerization, to take place, but these reactions may be reduced by proper regulation of the temperature, pressure and space velocity. Thus, increasing the liquid hourly space velocity of di-isobutylene from 1 to 10 volumes per volume of catalyst, when using a solid phosphoric acid catalyst at 200° C. and atmospheric pressure, decreases both side reactions while also reducing the amount of isomerization. At a constant space velocity of 10 and under atmospheric pressure, the isomerization is at a maximum of 190° C. and falls off slowly with increased temperatures and sharply with decreasing temperature. Depolymerization is at a maximum under these conditions at about 250° C. to 300° C. and polymerization decreases slightly with increased temperature. The proportion of isomers in the product is increased by increasing the operating pressure to about 100 pounds per square inch. In general, it is preferred to carry out isomerizations with this catalyst using a temperature between 150° C. and 300° C., a liquid hourly space velocity of 5 to 15, and a pressure of zero to twenty atmospheres or more.

Instead of solid phosphoric acid, aqueous solutions of phosphoric or sulfuric acid, particularly when used together with suitable addition agents such as cadmium sulfate or oxide, beryllium oxide or boric acid, etc., may be used as the catalyst in the isomerization reaction. Preferably, sulfuric acid of at least 70% concentration containing at least 3 mol per cent of the additive may be used. The best results are obtained with 95% sulfuric acid containing 5 mol per cent of a soluble cadmium salt, using a temperature of about 100° C. and preferably a relatively long contact time.

Zeolite type catalysts, particularly zeolites which have been treated with aluminum or zirconium salts or with an acid such as hydrogen chloride to replace the sodium of the zeolite with aluminum, zirconium or hydrogen ions, are also advantageous catalysts for the isomerization step of the invention. For the isomerization of di-isobutylene, temperatures of the order of about 150° C. to 250° C. are preferred with catalysts of this type, as at higher temperatures depolymerization of the unisomerized di-isobutylene increases rapidly. Aluminum sulfate or hydrogen chloride treated silica gels are also active isomerization catalysts for this process. Another type of catalyst which may be used is activated alumina, especially aluminas activated by treatment with acids such as hydrochloric, or more preferably acids of sulfur such, for example, as sulfuric or sulfamic acids and the like. Alumina activated by treatment with sulfuric acid has given good results when merely dried at 150° C. after the acid treatment. Alumina treated with hydrochloric or sulfamic acid, however, has little or no activity when merely dried but calcination at 300° to 700° C., preferably about 450° to 550° C., renders these catalysts highly active. The sulfamic acid treated aluminas are definitely superior. These new catalysts, which are a special feature of the invention, may be prepared from any suitable alumina such as bauxite or a so-called activated alumina such as "Alorco Grade A Activated Alumina" or other grades of the same trade marked product or the like, preferably in relatively finely divided form, for example 8–14 mesh. The alumina is treated with an aqueous solution of either sulfamic acid or suitable sulfamic acid salts (calcium, magnesium, beryllium, zinc, cadmium, mercury and aluminum sulfamates, for instance are suitable) or other derivatives thereof, and it will be understood that the expression "sulfamic treated alumina" as used hereinafter in the claims is intended to cover aluminas activated by any such sulfamic compounds. The treatment may be effected by immersing the alumina in the sulfamic treating solution preferably while agitating as in a revolving drum or the like. One to five hours of contact with treating solution of about 5 to 20 percent concentration are usually sufficient, but longer or shorter periods of time may be used with sulfamic acid solutions of other concentrations. It is desirable to reduce the sodium content of the alumina to at least 0.2% and more preferably below 0.1%. After the treatment with the sulfamic solution is complete, the excess solution is drained off and the catalyst dried and then calcined for about 1 to 6 hours. After drying at 175° C., for example, analyses show that the presence of sulfamate in the alumina is indicated by the considerable amounts of nitrogen and sulfur present. Practically all the nitrogen but none of the sulfur is lost during calcination. This correlates with an observed lack of activity of this catalyst prior to calcination. However, after calcining the catalyst is definitely superior to other catalysts prepared by treating alumina with acids such as hydrochloric acid and calcining, not only for isomerization of olefin polymers according to the process of the invention, as will be seen from the following examples, but also in the isomerization of less branched or straight chain olefins to produce products of different structure. Other reactions in which the new catalyst may be used include alkylations, catalytic cracking, reforming, hydroforming, etc. It is also effective for the dehydrogenation of alcohols and when used with nickel is advantageous for hydrogenation of olefins or dehydrogenation, for example, of naphthenes to aromatic hydrocarbons. The new sulfamic treated alumina catalyst, together with chromium oxide, is also effective in catalyzing hydrogenation and dehydrogenation reactions. Still other metals or compounds may be used with the new catalyst and such combinations are intended to be covered by the attached claims to this catalyst. Other acid treated alumina catalysts may nevertheless be used in the process of the invention, as previously indicated, this type of catalyst being especially advantageous for isomerization when the isomerization and depolymerization steps of the process are to be carried out in the same operation, as will be more fully described hereinafter.

Where the isomerization and depolymerization are effected in different units, the isomerization products may be conducted by line 13 to separation unit 11 from which an isomerizate-containing fraction is removed by line 14. When the separation between unreacted polymer and desired isomerization product effected in unit 11 is sufficient to satisfy the requirements of the intended final product, the stream of high isomerizate content removed by line 14 may be diverted by line 15. As previously pointed out, adequate separation by fractionation is usually difficult, however, and it is generally advantageous to conduct at least a part of the product by line 16 to a depolymerization unit 17 which comprises any suitable apparatus for effecting the selective depolymerization of the unisomerized polymer with minimum conversion of the desired isomerization products present. Such depolymerization may be carried out in different ways. Certain of the previously described isomerization catalysts, for example, may be advantageously used at higher temperatures to effect the depolymerization. Thus, an aluminum treated zeolite, which had been found to give excellent results in the isomerization of di-isobutylene at 200° C., was found to be very effective for depolymerization of the unisomerized polymer when used at temperatures between 250° C. and 450° C., preferably about 300° C. Equally good results in depolymerization were obtained with the zirconium and hydrogen chloride treated zeolites. Untreated alumina is practically inactive but alumina treated with acids such as sulfuric and hydrochloric acids or with cadmium chloride or the like are effective depolymerization catalysts at temperatures of about 300° C. to 400° C. Silica-alumina catalysts, especially when promoted with small amounts of zirconia and hydrogen chloride treated silica gel, are also good catalysts for the depolymerization. All of these catalysts effect more or less isomerization along with depolymerization and thus further increase the yield of the desired isomer. The tri-isobutylene separated in unit 4 from the original polymerization products may be advantageously fed by line 7 to unit 17 for depolymerization along with or separately from the unisomerized dimers.

After depolymerization to remove or reduce the amount of unisomerized polymer in the product, the hydrocarbons are conducted by line 18 to a separation stage 19 which may consist of a flash column or the like in which the depolymerization products are removed from the higher boiling isomerized polymer. The depolymerization products, usually substantially pure isobutylene in the case of the treatment of di-isobutylene, may be returned by line 20 to the polymerization unit 2 for reconversion to polymer and reuse in the process. In this way substantially complete conversion of the starting olefin to products of high supercharged rating may be effected.

The remaining higher boiling products consisting mainly of isomerized polymers together with some unreacted polymer are fed by line 21 to a hydrogenation unit 22 in which they are converted to saturated hydrocarbon, which product is removed by line 23. The hydrogenation may be effected by any of the methods found suitable for unisomerized olefin polymers; the procedures of United States Patents 2,067,368 and 2,139,351, for example, being particularly advantageous. Hydrogen for this reaction may be obtained by dehydrogenation of the unreacted hydrocarbons separated in unit 4 and removed by line 5 to unit 24. United States Patents 2,217,865 and 2,300,971 describe methods of dehydrogenating paraffins and olefins which may be used in this step of the process. The products of dehydrogenation are fed by line 25 to a separation unit 26 which may consist of distillation, absorption and/or reaction or other equipment suitable for separation of the hydrogen from the hydrocarbons. The separated hydrogen is fed by line 27 to hydrogenation unit 22. The olefin containing hydrocarbons may then be returned by line 28 to polymerization unit 2. If desired, a more complete separation of the hydrocarbon products from the dehydrogenation may be carried out and the unreacted hydrocarbon, removed by line 29, either returned to the dehydrogenation unit by line 30 or withdrawn from the system by line 31. Diolefins and/or olefins may be removed by line 32.

As previously pointed out, it is feasible to eliminate one of the units 9 or 17 and carry out the isomerization and depolymerization reactions in a single unit. Such methods of operation make it unnecessary to use both separation units 11 and 19, and even when different reactors are used for these reactions, one of these separations may be eliminated as by passing the products of isomerization through lines 13 and 33 directly to the depolymerization unit 17. In such cases it may still be desirable to employ separation unit 11 for the segregation of the initial polymers introduced by line 10, although this separation may, instead, be effected in unit 4 regardless of the particular method of isomerization and depolymerization adopted. Likewise, it may be advantageous to use depolymerizer 17 for conversion of trimers to starting olefin, even when carying out both isomerization and depolymerization of the dimers in unit 9.

The preferred catalyst for simultaneous isomerization and depolymerization of di-isobutylene is alumina or silica gel activated as previously described. With these catalysts temperatures of about 250° C. to 350° C. are advantageous. Even when employing a single reactor for these operations it is preferred to carry them out separately as, for example, by using catalyst tubes or towers maintained at the inlet end under conditions most favorable for the desired isomerization and at the outlet end under conditions better adapted to promote depolymerization of the unisomerized polymer. The same or different catalysts may be used in these reaction zones. In fact, it is also advantageous when the depolymerization is effected simultaneously with the isomerization to use both types of catalysts, that is, mixtures of one or more catalysts which promote isomerization with one or more catalysts which favor the desired depolymerization. As previously pointed out, both reactions take place to some extent with both types of catalyst.

The following examples are illustrative of the results which may be obtained by the new method of operation and show the advantages of the process.

was hydrogenated in the liquid phase in the presence of Raney nickel catalyst.

Using calcined phosphoric acid on a siliceous carrier as the isomerization catalyst, the following results were obtained under different operating conditions:

| Temperature | Pressure | Liquid Hourly Space Velocity | Water in Feed (Wt. per cent) | Weight Per Cent of Hydrogenated Product | | |
|---|---|---|---|---|---|---|
| | | | | Boiling 90–105° C. (corresponding to unisomerized di-isobutylene | Boiling 105–120° C. (corresponding to isomerized di-isobutylene) | Higher Boiling Products |
| 150° C | Atm. 1 | 1 | None | 49.4 | 34.3 | 16.3 |
| 200° C | 1 | 1 | None | 41.6 | 39.0 | 19.4 |
| 200° C | 1 | 5 | None | 67.2 | 26.5 | 6.4 |
| 200° C | 1 | 10 | None | 74.8 | 21.5 | 3.6 |
| 200° C | 1 | 10 | 0.0056 | 51.0 | 45.2 | 3.7 |
| 250° C | 1 | 10 | 0.0056 | 54.4 | 42.3 | 3.4 |
| 300° C | 1 | 10 | 0.0056 | 63.7 | 34.9 | 1.4 |
| 350° C | 1 | 10 | 0.0056 | 72.0 | 25.0 | 3.0 |
| 200° C | 1 | 10 | 1.0 | 59.4 | 37.0 | 3.6 |
| 250° C | 6⅔ | 8.6 | 1.0 | 18.3 | 55.0 | 25.0 |

2,3,4-trimethyl pentane has an A. S. T. M. octane number of only 97 compared to 100 for the hydrogenation product of the starting polymer, but, when tested in a blend with an equal volume of straight run aviation gasoline base stock of 73 octane number to which 3 cc. of tetraethyl lead per gallon is added using a supercharged C. F. R. engine having a 2⅝ inch cylinder and operated at 1200 R. P. M., the available output is 1.18 times that of the corresponding blend containing iso-octane, i. e. 2,2,4-trimethyl pentane. This represents an 18% increase in power from the same volume of fuel compared with the hydrogenated starting polymer. Similarly 2,2,3-trimethyl pentane give a 27% increase in power and 2,3,3-trimethyl pentane a 22% increase. The mixture of these three products in the proportion of 80%, 10% and 10% respectively gives 19.3% more power than can be obtained from iso-octane.

*Example II*

To show how the percentage of isomerized trimethyl pentenes in the final product may be increased, the following results obtained by the use of different catalysts in the same type of apparatus used in Example I are given. A liquid hourly space velocity of 10 and atmospheric pressure were used in all cases without addition of water to the feed. The results are expressed as weight percent.

| | Catalyst Temperature | Isomerized Di-isobutylene in the octene products (boiling 105°–120° C.) | Unreacted (boiling 90°–105° C.) | Depolymerization products (boiling below 90° C.) | Products boiling above 120° C. |
|---|---|---|---|---|---|
| | | | Based on Total Product | | |
| | ° C. | Per cent | Per cent | Per cent | Per cent |
| Alumina treated with hydrogen chloride and calcined at 500° C | 300 | 8.1 | 29.5 | 63.7 | 1.2 |
| | 400 | 68.8 | 4.6 | 83.9 | 1.4 |
| Alumina treated with sulfamic acid and calcined at 500° C | 300 | 86.8 | 2.6 | 75.6 | 4.6 |
| Zeolite treated to replace sodium by aluminum | 200 | 56 | 20.9 | 41.3 | 11.1 |
| | 400 | 80 | 1.1 | 92.2 | 1.6 |
| Aluminum sulfate | 300 | 18.3 | 48.3 | 37.9 | 3.0 |

*Example I*

A butane-butylene fraction was treated by the cold sulfuric acid polymerization process and the resulting di-isobutylene was isomerized by passing it in vapor form through a heated stainless steel tube packed with catalyst. The products were condensed by a water-cooled condenser and distilled in a column of 20 theoretical plates using a reflux ratio of 20 to 1. The isomerizate While the invention has been described with special reference to the treatment of di-isobutylene, the same principles may be applied to the improvement of other olefin polymers. The process may be applied, for example, to the isomerization of interpolymers of isobutylene with other olefins since these polymers usually contain substantial amounts of 2,2,4-trimethyl pentenes which may be reacted exactly as described in connection with di-isobutylene. Interpolymers which initially contain the desired isomers may be subjected to the depolymerization treatment only to selectively convert mainly the copolymer content; the formed mono-olefin being recycled to the polymerization unit while the separated unchanged isomer is hydrogenated or otherwise utilized. Polymers of tertiary amylenes may be isomerized in any of the ways described for the treatment of isobutylene polymers, and the polymers produced from olefinic mixtures of wider boiling range such as cracking gases containing $C_3$ to $C_5$ olefins are also suitable starting material for the process. It will therefore be seen that the invention is capable of wide variation not only in regard to the polymers which may be used but also with respect to the operating conditions which may be employed, and it will be understood that it is not limited to the examples disclosed nor by any theory advanced in explanation of the improved results which are obtained.

We claim as our invention:

1. A process of producing octanes of high supercharged rating which comprises contacting di-isobutylene with an isomerization catalyst, reacting the resulting mixture of di-isobutylene and octene isomerization products thereof in the presence of a calcined sulfamic acid treated alumina catalyst to substantially depolymerize said di-isobutylene content, separating the depolymerization products and hydrogenating the resulting isomerized octenes.

2. A process of producing octanes of high supercharged rating which comprises contacting di-isobutylene with a phosphoric acid isomerization catalyst, reacting the product containing unisomerized di-isobutylene in the presence of a zeolite catalyst at a temperature between 250° C. and 450° C., and hydrogenating the resulting octenes.

3. A process of producing octanes of high supercharged rating which comprises contacting di-isobutylene with a silica gel isomerization catalyst, reacting the resulting mixture of 2,2,4- and 2,3,4-trimethylpentanes in the presence of a calcined sulfamic acid treated alumina catalyst to selectively depolymerize the 2,2,4-trimethylpentane, separating the depolymerization products and hydrogenating the 2,3,4-trimethyl pentene obtained.

4. A process of producing octanes of high supercharged rating which comprises contacting di-isobutylene with a zeolite isomerization catalyst, reacting the resulting mixture of 2,2,4- and 2,3,4-trimethylpentanes in the presence of a calcined sulfamic acid treated alumina catalyst to selectively depolymerize the 2,2,4-trimethylpentane, separating the depolymerization products and hydrogenating the 2,3,4-trimethyl pentene obtained.

5. A process of producing octanes of high supercharged rating which comprises contacting di-isobutylene with a zeolite isomerization catalyst at a temperature between about 150° C. and 250° C., reacting the product containing unisomerized di-isobutylene in the presence of a zeolite catalyst at a temperature between 250° C. and 450° C., and hydrogenating the resulting octenes.

6. A process of producing octanes of high supercharged rating which comprises contacting di-isobutylene with a phosphoric acid isomerization catalyst, reacting the product containing unisomerized di-isobutylene in the presence of an activated alumina catalyst to effect depolymerization of di-isobutylene, and hydrogenating the octenes obtained.

7. A process of producing octanes having a supercharged rating superior to that of iso-octane which comprises contacting di-isobutylene with a phosphoric acid catalyst under conditions at which substantial isomerization of at least a part of the di-isobutylene takes place, treating the isomerization product to depolymerize di-isobutylene present therein, and hydrogenating the remaining octenes.

8. A process of producing octanes having a supercharged rating superior to that of iso-octane which comprises contacting di-isobutylene with a silica gel catalyst under conditions at which isomerization of said di-isobutylene takes place, treating the isomerization product to depolymerize di-isobutylene present therein, and hydrogenating the remaining octenes.

9. A process of producing octanes having a supercharged rating superior to that of iso-octane which comprises contacting di-isobutylene with an isomerization catalyst under conditions at which a 2,3,4-trimethyl pentene is produced, treating the isomerization product to depolymerize di-isobutylene present therein, and hydrogenating the remaining 2,3,4-trimethyl pentene.

10. A process of producing octanes of high supercharged rating which comprises polymerizing isobutylene to form di-isobutylene and higher boiling polymers, separating said di-isobutylene from the higher boiling polymers, isomerizing the di-isobutylene in the presence of an isomerization catalyst, depolymerizing unisomerized di-isobutylene present in the isomerization product, returning isobutylene formed by said depolymerization to said isobutylene polymerization, and hydrogenating the isomerized di-isobutylene.

11. A process of producing hydrocarbons of high supercharged rating from polymerization products of isobutylene which comprises subjecting di-isobutylene to isomerization conditions in the presence of a catalyst, heating the product in the presence of a zeolite depolymerization catalyst, separating the depolymerization products and hydrogenating the resulting octenes.

12. A process of separating a 2,2,4-trimethyl pentene from an isomer thereof which comprises reacting a mixture of said hydrocarbons in the presence of an activated alumina catalyst at a temperature between about 300° C. and 450° C. at which said 2,2,4-trimethyl pentene is converted to isobutylene, and separating the undepolymerized trimethyl pentene isomer from said isobutylene.

13. A process for producing gasoline components of increased power output which comprises subjecting a 2,2,4-trimethyl pentene to isomerization and depolymerization in the presence of a sulfamic acid treated alumina catalyst which has been calcined at 300° C. to 600° C., separating the depolymerization products from the isomerizate and hydrogenating the latter.

14. A process for depolymerizing olefin polymers which comprises contacting the polymer at 300° C. to 450° C. with a calcined sulfamic acid treated alumina catalyst.

15. A process of producing blending agents for gasoline comprising subjecting a polymer of an olefin having from 3 to 5 carbon atoms to isomerization to produce an isomer having an increased power output, treating the isomerization product to depolymerize unisomerized polymer present therein and hydrogenating the isomerizate.

ALAN C. NIXON.
ORRIS L. DAVIS.

REFERENCES CITED

The following references are of record in the file of this patent:

UNITED STATES PATENTS

| Number | Name | Date |
|---|---|---|
| 2,276,199 | Kassel | Mar. 10, 1942 |
| 1,778,517 | Benner et al. | Oct. 14, 1930 |
| 2,216,285 | Thomas et al. | Oct. 1, 1940 |
| 2,357,741 | Howes et al. | Sept. 5, 1944 |
| 2,340,878 | Holt et al. | Feb. 8, 1944 |

OTHER REFERENCES

Smittering et al., J. I. P. T. 26, 295 (1940).